United States Patent [19]
Fukaya et al.

[11] Patent Number: 5,107,414
[45] Date of Patent: Apr. 21, 1992

[54] METHOD FOR DETERMINING A MACHINING METHOD IN NUMERICAL CONTROL INFORMATION GENERATING APPARATUS

[75] Inventors: Yasushi Fukaya; Yuto Mizukami, both of Niwa-Gun Aichi, Japan

[73] Assignee: Kabushiki Kaisha Okuma Tekkosho, Aichi, Japan

[21] Appl. No.: 457,166

[22] Filed: Dec. 26, 1989

[30] Foreign Application Priority Data

Dec. 26, 1988 [JP] Japan .................. 63-328408

[51] Int. Cl.$^5$ ............................................. G06F 15/46
[52] U.S. Cl. ...................... 364/191; 364/474.21; 364/474.32
[58] Field of Search .................. 364/188–193, 364/474.11, 474.2, 474.21, 474.23, 474.25, 474.27, 474.32; 318/567, 568.1, 568.13

[56] References Cited
U.S. PATENT DOCUMENTS

| | | | |
|---|---|---|---|
| 4,445,182 | 4/1984 | Morita et al. ................. | 364/474.21 |
| 4,639,855 | 1/1987 | Sekikawa ..................... | 364/188 |
| 4,680,719 | 7/1987 | Kishi et al. ................... | 364/474.21 |
| 4,723,203 | 2/1988 | Kishi et al. ................... | 364/191 |
| 4,821,201 | 4/1989 | Kawamura et al. ........... | 364/192 |
| 4,878,172 | 10/1989 | Matsumura ................... | 364/191 |
| 4,998,196 | 3/1991 | Seki et al. ..................... | 364/474.21 |

*Primary Examiner*—Jerry Smith
*Assistant Examiner*—Thomas E. Brown
*Attorney, Agent, or Firm*—Wenderoth, Lind & Ponack

[57] ABSTRACT

A method for determining a machining method in a numerical control information generating apparatus is realized by the steps of: dividing an area where recessed shapes overlap into a machining area where recessed shapes overlap and an area where recessed shapes do not overlap; determining a cutting tool for a machining area where recessed shapes do not overlap; determining whether or not the machining area where recessed shapes overlap can be cut by the same cutting tool, and combining the machining area where recessed shapes overlap with the machining area where recessed shapes do not overlap. As a result of this, machining modes can be determined automatically for a shape where recessed shapes overlap.

7 Claims, 11 Drawing Sheets

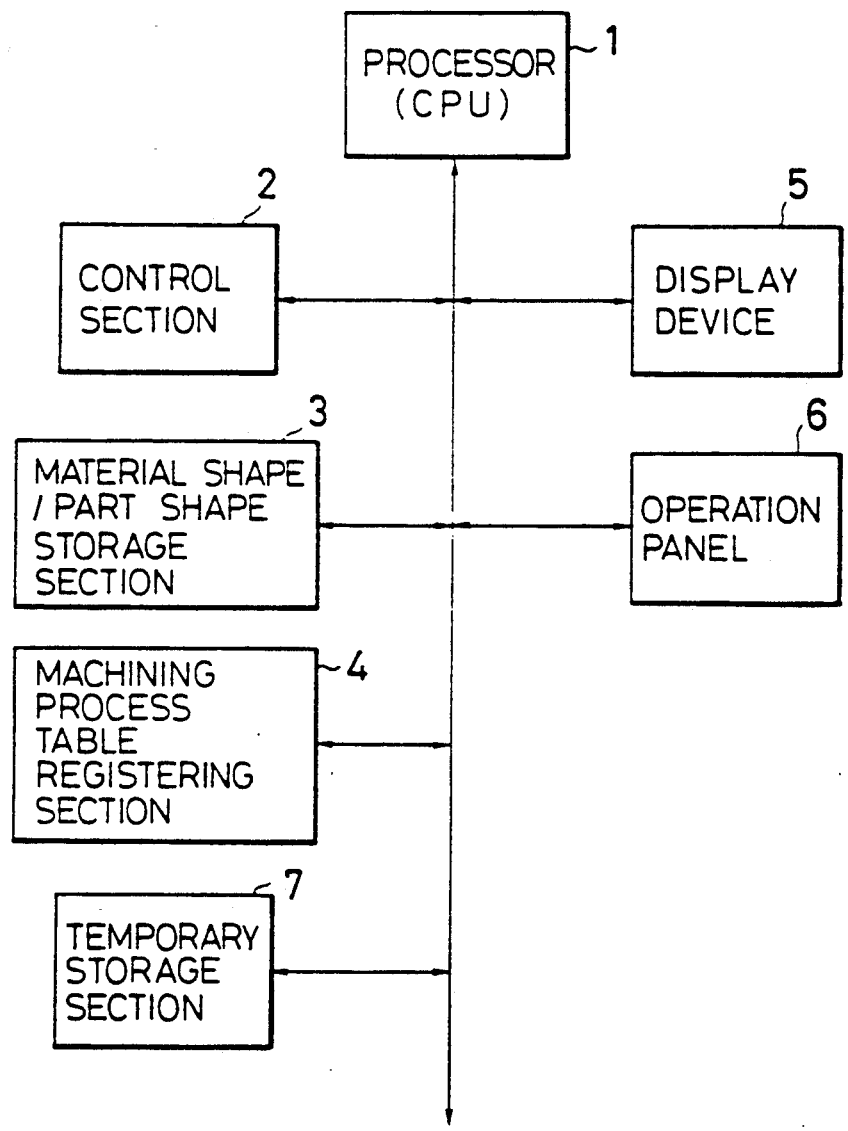
F I G. 6

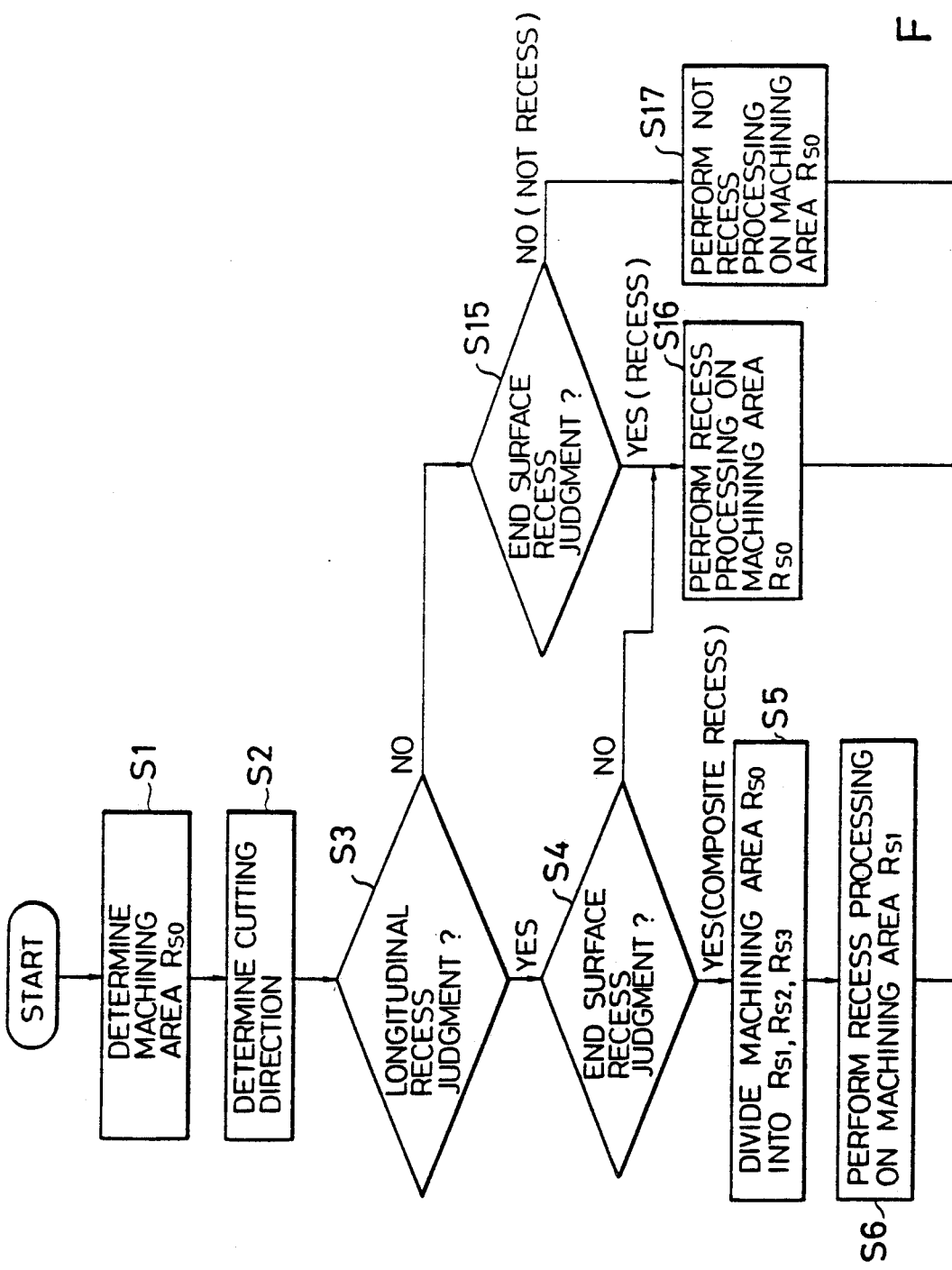

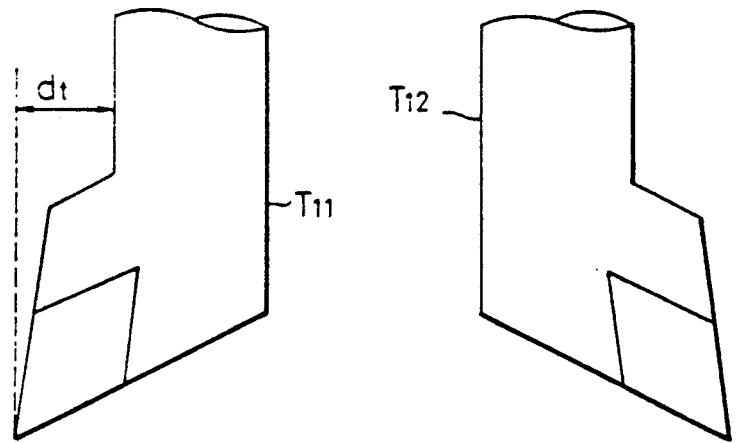
F I G. 11A    F I G. 11B
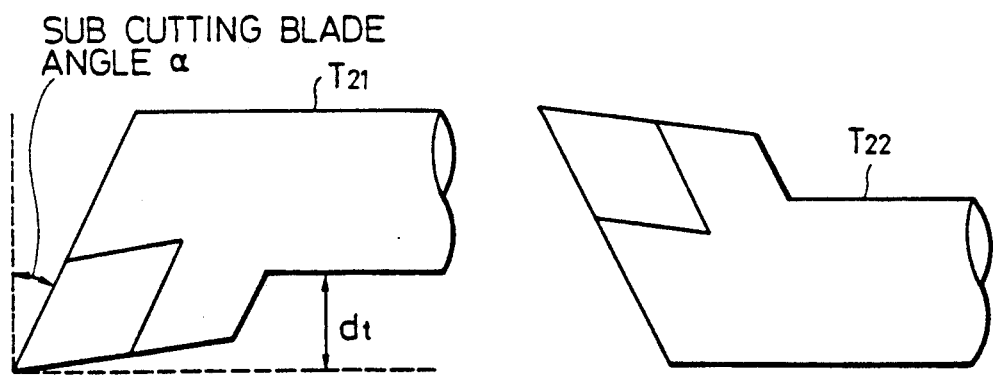
F I G. 11C    F I G. 11D

METHOD FOR DETERMINING A MACHINING METHOD IN NUMERICAL CONTROL INFORMATION GENERATING APPARATUS

BACKGROUND OF THE INVENTION

The present invention relates to a method for determining a machining method in a numerical control information generating apparatus.

In a numerical control machining tool, information for numerical control information generating apparatus which inputs machining data on an interactive basis and prepares numerical control information for the purpose of simplifying the generation of numerical control information is widely used. With such numerical control information generating apparatus, inputting the quality and shape of the material and the machining methods (areas to be machined, cutting direction, cutting tool, cutting conditions, sequence of machining, etc.) enables numerical control information for machining to be generated. In recent years, there has appeared a numerical control information generating apparatus which determines the machining method automatically and which generates the numerical control information through the input of the shape of the material and of the parts.

FIG. 1 shows one example of the shape of a material and of the parts. In the above-mentioned numerical control information generating apparatus which determines machining methods automatically, machining methods for a recessed shape (hereinafter referred to as "a recess") for which downward cutting is required can be determined, as shown in FIG. 1. Here, the recess includes the shape of areas $E_1$ to $E_6$ shown in FIG. 2. Areas $E_1$, $E_4$, $E_5$, and $E_6$ are longitudinal recesses and areas $E_2$, $E_3$, $E_6$ and $E_7$ are end surface recesses.

Next, a process in which the numerical control information generating apparatus of the prior art determines machining methods for a recess will be explained with reference to FIG. 4.

When the shape of a material and of the parts as shown in FIG. 1 are input, a machining area $R_0$ formed by a figure element list ($l_3$, $l_4$, $l_5$, $l_{w1}$) is determined by comparing the two shapes (Step S100). Then, since this machining area $R_0$ belongs to an outer circumference, its cutting direction is determined to be "←" (Step S101). Of the machining area $R_0$, a determination is made as to whether or not a downward cut is needed by comparing a figure element list ($l_3$, $l_4$, $l_5$, $l_{w1}$) forming the shape of parts and a cutting direction "←". If a downward cut is needed, it is determined to be a longitudinal recess (Step S102). In the example of FIG. 1, because a figure element $l_3$ exists, it is determined to be a longitudinal recess.

Next, the cutting tool is determined by the cutting direction determined in the above and by the fact that it is a longitudinal recess (Step S103). For example, a tool as shown in FIG. 5A is determined. After comparing the angle $\alpha$ formed by the downward shape ($l_3$ in FIG. 1) of the longitudinal recess and the Z-axis with the $\beta$ (hereinafter referred to as "a sub-cutting blade angle") formed by the sub-cutting blade of the tool and the Z-axis, a check is made to see whether or not the edge of a tool blade interferes while machining a downward shape is being machined (Step S105). If $\alpha > \beta$, the edge of the tool blade is not interfered with and by using the tool, a downward shape can be machined. When $\alpha \geq \beta$ in the case of $\alpha$ of FIG. 1 and $\beta$ of FIG. 5A, a downward shape (figure element $l_3$ in FIG. 1) cannot be machined. In such a case, as shown in FIG. 3, the figure element $l_3$ passing the start point A of the figure element $l_3$ and making an angle greater $\beta$ with respect to the Z-axis is generated. Further, a figure element $l_4$ is divided into figure element $l_4'$ and $l_4''$ at the termination $\beta$ of a figure element $l_3$, and the machining area $R_0$ is divided into a machining area $R_1$ formed by a figure element list ($l_3$, $l_4''$, $l_5$, $l_{w1}$) and a machining area $R_2$ formed by a figure element ($l_3$, $l_4'$, $l_5$) (Step S106). A cutting direction "→" is determined for the machining area $R_2$ divided in this way (Step S107) and the tool as shown in FIG. 5B is selected (Step S108). Cutting conditions and the sequence of machining are determined (Steps S109 and S110), completing the determination of the machining methods or modes.

When the part is determined to be not a longitudinal recess in the Step S102 of the flowchart of FIG. 4, a tool is determined by the cutting direction (Step S104) and control jumps to the Step S109. Machining modes for the end surface recess are determined in similar processes.

In the determination method of the prior art as mentioned above, machining modes for machining a recess like areas $E_1$ to $E_8$ shown in FIG. 2 can be determined automatically. However, for a shape in which a longitudinal recess and an end surface recess overlap, machining modes cannot be determined automatically. Therefore, to prepare numerical control information used for machining such shapes, the operator must specify a machining area, a cutting direction, a cutting tool and the sequence of machining one by one. For a shape as shown in FIG. 8, efforts to input the above-mentioned data are great because the machining methods are complex, and therefore a great burden is placed on the operator.

That is, in the numerical control information generating apparatus of the prior art, for a simple recessed shape, machining methods can be determined automatically by checking the interference of the edge of the tool blade. However, for a complex shape in which recessed shapes overlap, the machining methods cannot be determined automatically. When the operator machines a shape as shown in FIG. 8, inputting the machining methods manually is required. Therefore a great deal of efforts are spent on the input.

SUMMARY OF THE INVENTION

The present invention has been devised in light of the above-mentioned circumstances. Objects of the present invention are to provide a determination method for machining methods capable of automatically determining machining modes for a shape in which a longitudinal recess and an end surface recess overlap with which the numerical control information generating apparatus of the prior art cannot handle and to lighten the operator's burden.

These and other objects, features and advantages of the present invention will become clear by the following description of a preferred embodiment of the present invention with reference to the accompanying drawings.

BRIEF DESCRIPTION OF THE DRAWINGS

In the accompanying drawings:

FIG. 6 is a block diagram of a device for realizing the processes of the present invention;

FIGS. 11A to 11D are views for explaining a state in which tools are determined.

DESCRIPTION OF THE PREFERRED EMBODIMENTS

An embodiment of the present invention will be explained with reference to the drawings.

Figure 1:
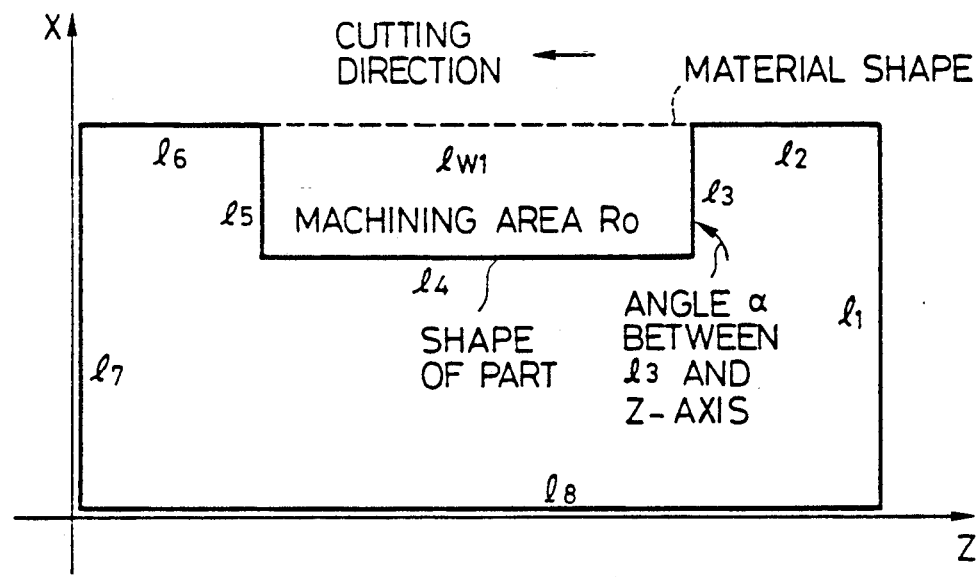
FIGS. 1 to 3 are views for explaining machined states of the prior art.
Figure 2:
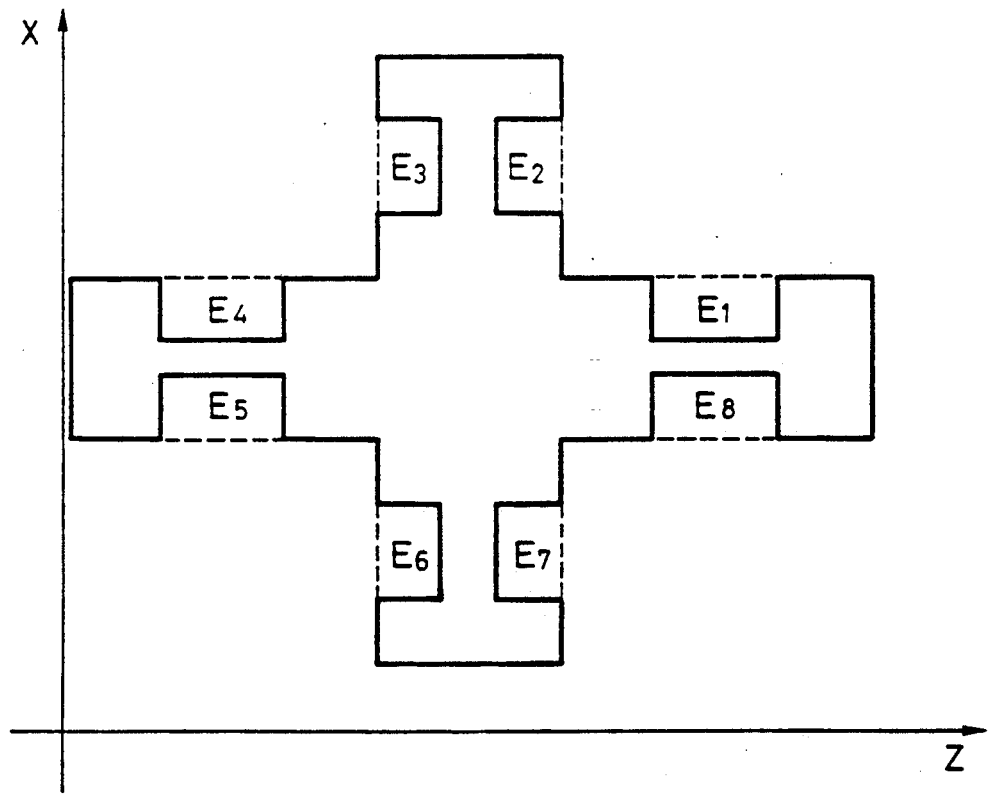
Figure 3:
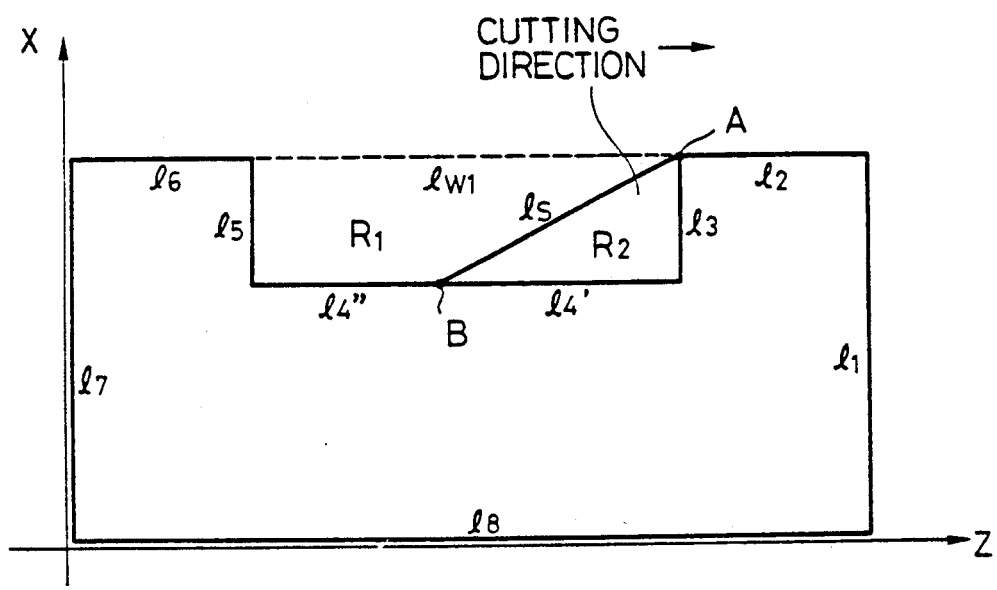
Figure 4:
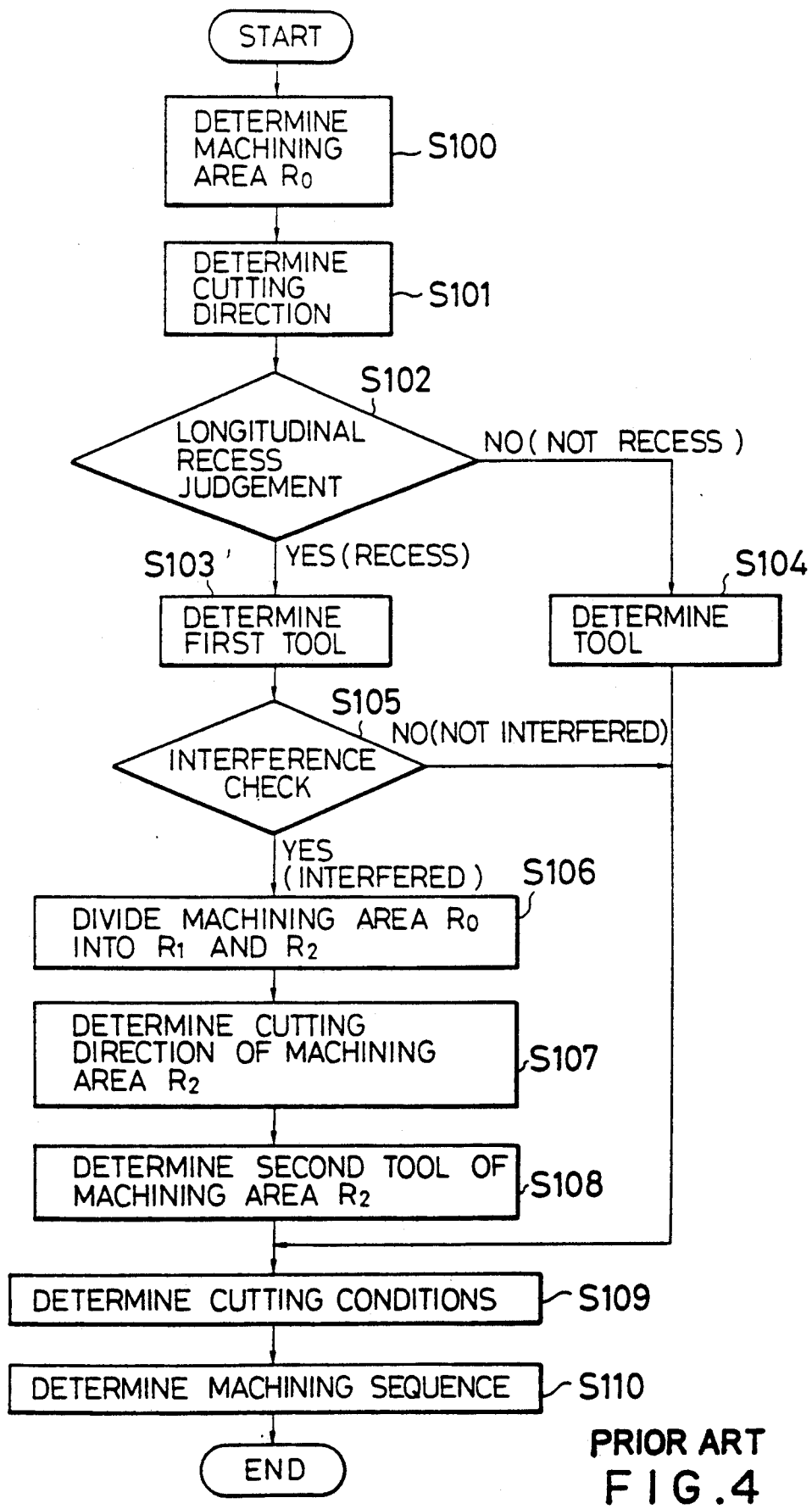
FIG. 4 is a flowchart for illustrating the example of the prior art operation.
Figures 5A, 5B:
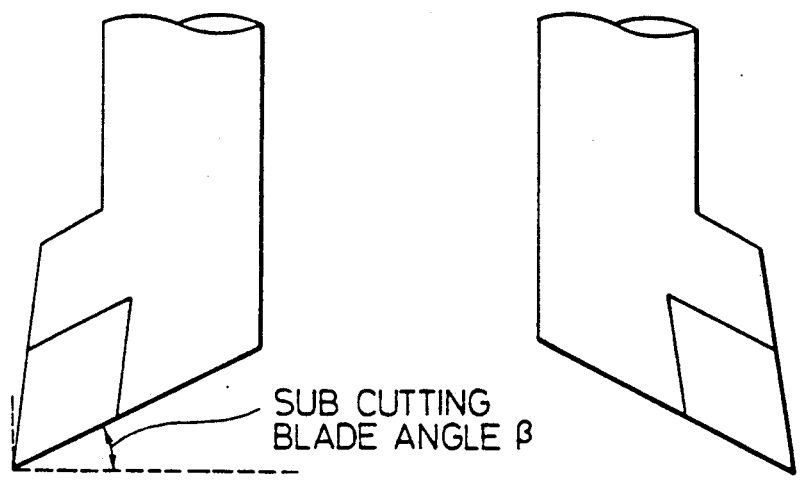
FIGS. 5A and 5B are views for explaining a state in which tools are determined.
Figure 7B:
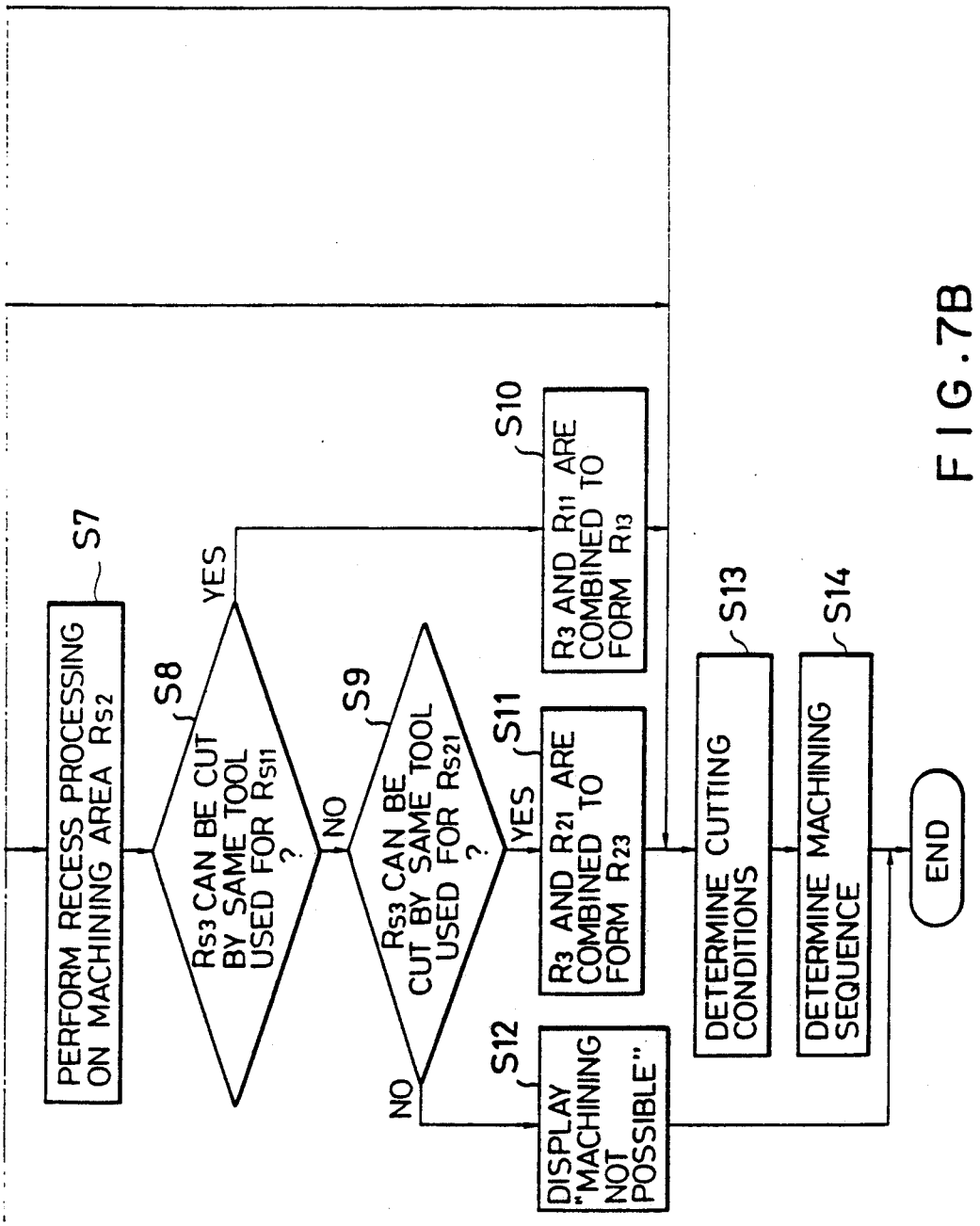
FIG. 7, consisting of FIG. 7A and 7B, is a flowchart for illustrating the example of the operation.
Figure 8:
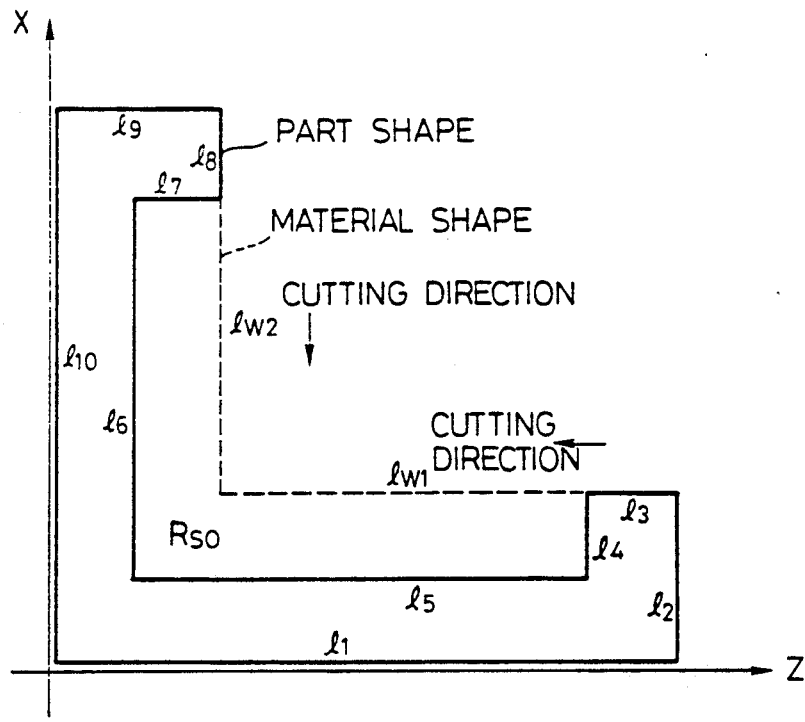
FIGS. 8 to 10 are views for explaining a machined state.

FIG. 6 is a block diagram of a numerical control information generating apparatus of the present invention. FIG. 7, consisting of FIGS. 7A and 7B, is a flowchart for illustrating an example of the operation of the present invention. Shapes of a material and parts which are input via a display device 5 and an operation panel 6 beforehand are stored in a material shape/part shape storage section 3. Here, shapes of the material and the parts as shown in FIG. 8 are assumed to have been stored.

A processor (CPU) 1 reads in a control program from a control section 2 and controls devices. First, the processor 1 reads in the shapes of a material and parts from the material shape/part shape storage section 3, determines a machining area $R_{S0}$ formed by a figure element list ($l_4, l_5, l_6, l_7, l_{w2}, l_{w1}$) shown in FIG. 8, and stores the machining area $R_{S0}$ in a temporary storage section 7. Since the above-mentioned machining area $R_{S0}$ determined belongs to both the outer circumference and the end surface, cutting directions are determined to be "←" and "↓" respectively (Step S2). These cutting directions are stored in the temporary storage section 7. Next, the processor 1 reads in a figure element list ($l_4, l_5, l_6, l_7$) forming the part shape and the cutting direction "←" of the machining area $R_{S0}$, and determined whether or not a downward cut is needed by comparing them (Step S3). Since a figure element $l_4$ exists in this embodiment, it is determined that a downward cut is needed. Namely, it is judged to be a longitudinal recess. Similarly, the processor 1 determines whether or not a downward cut is needed by reading in a figure element list ($l_4, l_5, l_6, l_7$) and a cutting direction "↓" from the temporary storage section 7 and by comparing them (Step S4). In this embodiment, because a figure element $l_7$ exists, it is determined that a downward cut is needed. Namely, it is determined to be an end surface recess. Therefore, since the machining area $R_{S0}$ is determined to be a recess with respect to both the cutting direction of "←" and "↓", the shape thereof is one in which a longitudinal recess and an end surface recess overlap (hereinafter referred to as "a composite recess").

Figure 9:
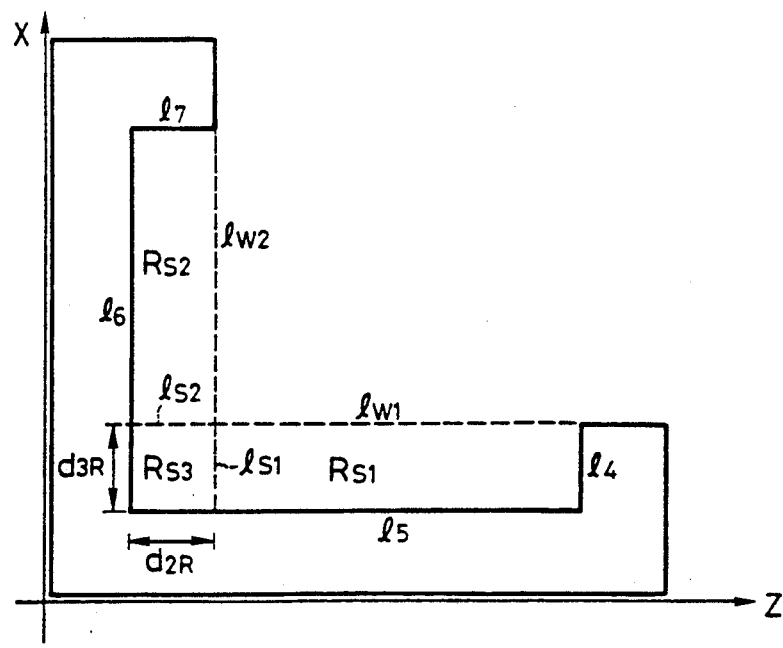
Figure 10:
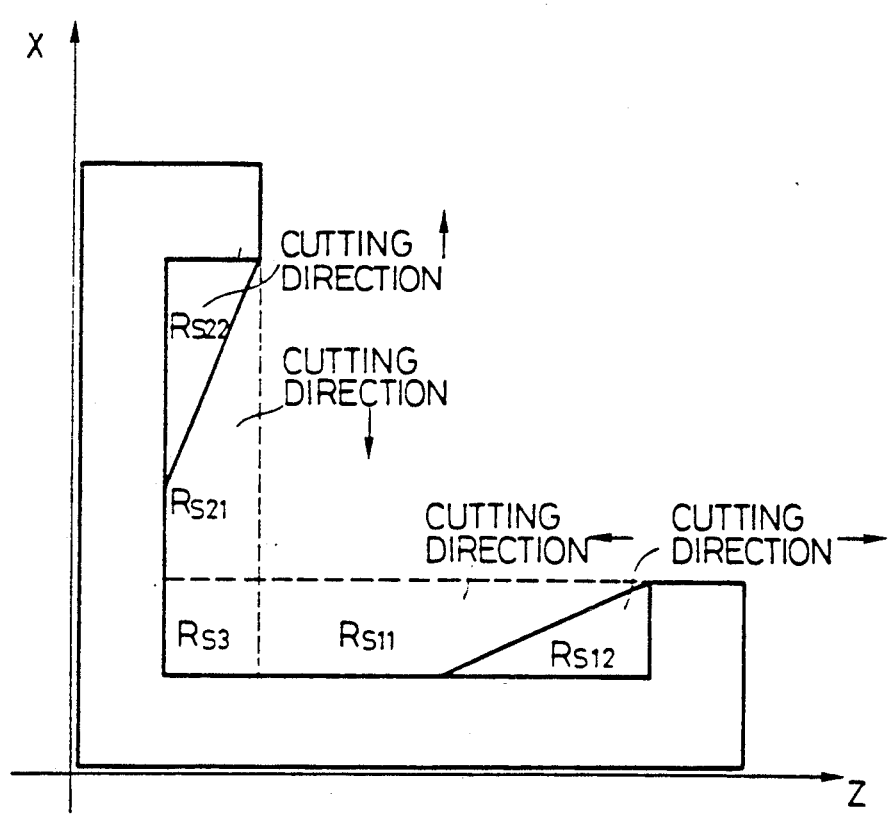

The processor 1 reads in the machining area $R_{S0}$ from the temporary storage section 7, generates figure element $l_{s1}$ and $l_{s2}$ and divides it into machining areas $R_{s1}$, $R_{s2}$, $R_{s3}$ (Step S5), as shown in FIG. 9. These machining areas $R_{s1}$, $R_{s2}$ and $R_{s3}$ are stored in the temporary storage section 7. Next, with respect to the machining area $R_{s1}$, the processor 1 divides the machining area $R_{s1}$ into machining areas $R_{s11}$ and $R_{s12}$, and determines the cutting direction, as shown in FIG. 10, in the same way as that of the prior art. The processor 1 determines that tools for cutting the machining areas $R_{s11}$ and $R_{s12}$, are $T_{11}$ and $T_{12}$, as shown in FIGS. 11A and 11B. They are stored in the temporary storage section 7 (Step S6). Also, with respect to the machining area $R_{s2}$, the processor 1 divides the machining area $R_{s2}$ into machining areas $R_{s21}$ and $R_{s22}$ and determines the cutting direction, as shown in FIG. 10, in the same way as that of the prior art. The processor 1 determines that tools for cutting machining areas $R_{s21}$ and $R_{s22}$, are $T_{21}$ and $T_{22}$, as shown in FIGS. 11C and 11D. They are stored in the temporary storage section 7 (Step S7). With respect to the remaining machining area $R_{s3}$, the processor 1 determines whether or not the machining area $R_{s3}$ can be cut by any one of the tools $T_{11}$ and $T_{12}$ for cutting the machining areas $R_{S11}$ and $R_{s21}$ adjacent to the machining area $R_{s3}$ (Steps S8 and S9).

Figure 12A:
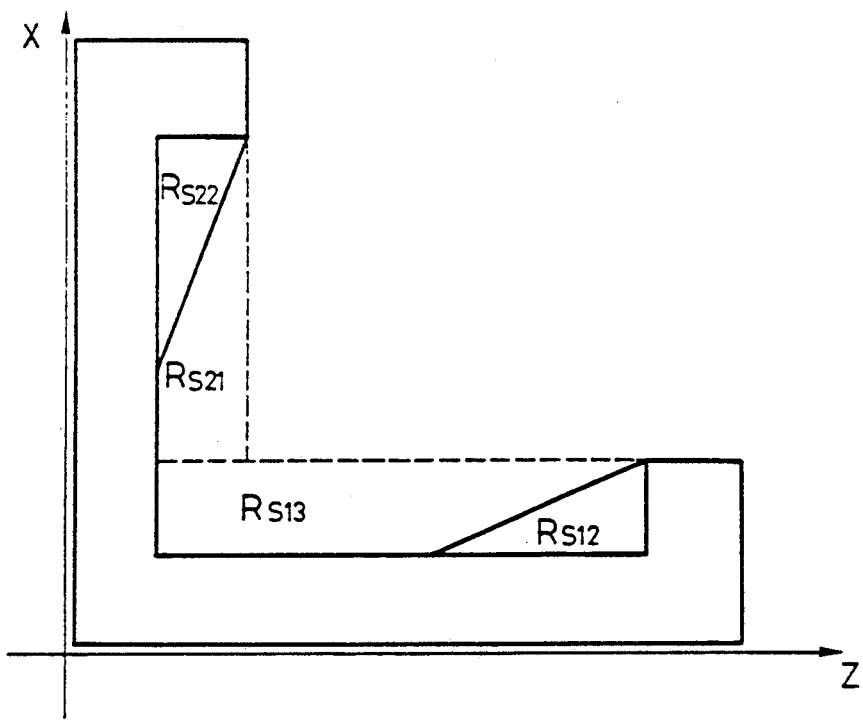
FIGS. 12A and 12B are views for explaining machined states of the present invention.
Figure 12B:
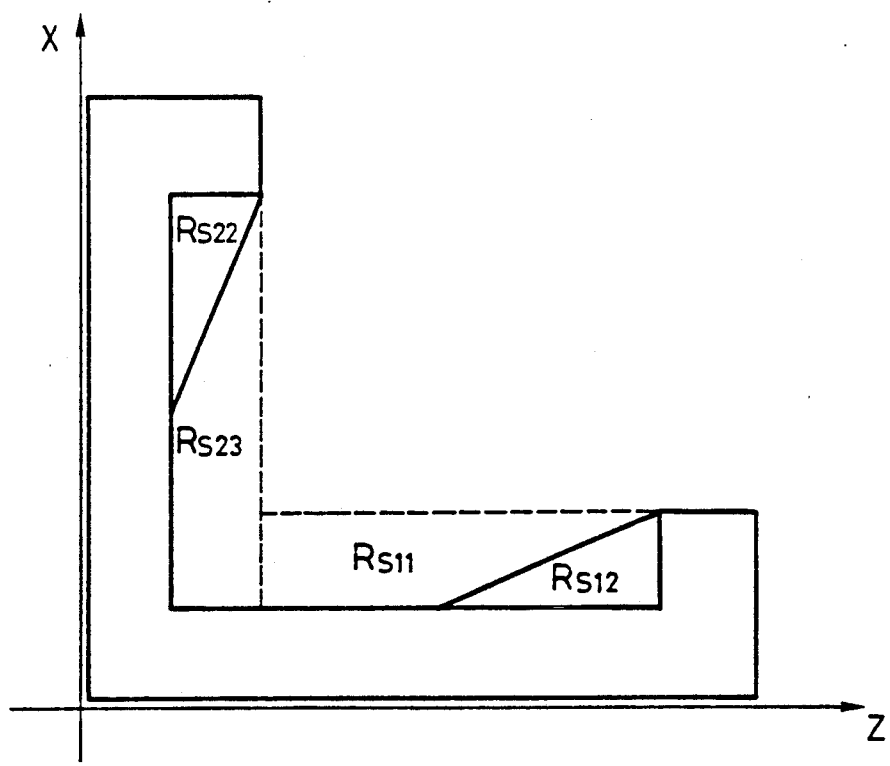

In this determination method, $d_{2R}$ of FIG. 9 and dt of FIG. 11A are compared with each other (Step S8). When $d_{2R} <$ dt, since the machining area $R_{s23}$ can be cut by the tool $T_{11}$, the machining area $R_{s3}$ is combined with the machining area $R_{s11}$ (Step S10) and it is stored in the temporary storage section 7 as the machining area $R_{s13}$ as shown in FIG. 12A. However, in the machining sequence at this junction, machining of the machining area $R_{s21}$ is performed before that of the machining area $R_{s13}$. When $d_{2R} \geq$ dt in the above-mentioned Step S8, $d_{2R}$ of FIG. 9 and dt of FIG. 11C are compared with each other (Step S10). If $d_{2R} <$ dt, since the machining area $R_{s23}$ can be cut by the tool $T_{11}$, the machining area $R_{s3}$ can be cut by the tool $T_{11}$, the machining area $R_{s3}$ is combined with the machining area $R_{s21}$ (Step S11) and stored in the temporary storage section 7 as the machining area $R_{s23}$ as shown in FIG. 12B. However, in the machining sequence at this juncture, machining of the machining area $R_{s11}$ is performed before that of the machining area $R_{s23}$. If $d_{3R} \geq$ dt, since the machining area $R_{s3}$ cannot be machined, the processor 1 displays this fact on the display device 5 and informs the operator of this fact (Step S12).

As described above, for example, if the condition $d_{2R} <$ dt holds and the machining area $R_{s13}$ has been generated, stored in the temporary storage section 7 are a cutting direction "←" and a cutting tool $T_1$ for the machining area $R_{s13}$, a cutting direction "→" and a cutting tool $T_{12}$ for the machining area $R_{s12}$, and a cutting direction "↓" and a cutting tool $T_{21}$ for the machining area $R_{s21}$, and a cutting direction "↑" and a cutting tool $T_{22}$ for the machining area $R_{s22}$. The processor 1 determines cutting conditions and machining sequence (Steps S13 and S14) for respective areas. At the completion of the determination, the machining areas, the cutting directions, the cutting tools, the cutting conditions and the machining sequence are registered into a machining process table registering section 4.

When the part is determined not to be a longitudinal recess with respect to a cutting direction "←" in the above Step S3 of the flowchart of FIG. 7, a determination is made as to whether or not the part is an end surface recess with respect to the cutting direction "↓" in the Step S15. If the part is an end surface recess, processing similar to that of the prior art is performed on the machining area $R_{S0}$ (Step S16). If not, processing (for a shape other than a recess) similar to that of the prior art is performed (Step S17). In the above Step S4 of the flowchart of FIG. 7, when the part is determined not to be an end surface recess, processing (for a longitudinal recess) similar to that of the prior art is performed on the machining area $R_{S0}$ (Step S16).

As set forth hereinabove, according to the present invention, machining modes can be determined automatically for a composite recess for which machining modes cannot be determined by the numerical control information generating apparatus of the prior art. Hence, efforts to input data fur numerical control information generation can be reduced greatly.

As many apparently widely different embodiments of the present invention can be made without departing from the spirit and scope thereof, it is to be understood that this invention is not limited to the specific embodiments thereof except as defined in the appended claims.

What is claimed is:

1. A method for determining a machining method in a numerical control information generating apparatus for lathe machining, the method comprising the steps of: dividing a machining area recognized by a longitudinal recess shape and an end surface shape into an area where said longitudinal recess shape and a said end surface recess shape overlap and an area where they do not overlap in a state in which a longitudinal recessed shape and an end surface recessed shape of the shapes of parts which have been input overlap; determining a cutting tool for said not-overlapping machining area; determining whether or not said overlapping machining area can be cut by said cutting tool; combining said overlapping machining area with said not-overlapping machining area and using it in the generation of numerical control information if the result of said judgement indicates that cutting is possible, and if the result of said judgement indicates that cutting is not possible, displaying and notifying this fact.

2. A method for determining a machining method as claimed in claim 1, wherein said division of a machining area is performed in such a way that a cutting direction is determined, after which the presence of said longitudinal recess shape is determined and then the presence of said end surface recess shape is determined.

3. A method for determining a machining method as claimed in claim 2, wherein when it is determined that no said longitudinal recessed shape exists and no end surface recessed shape exists, processing for a shape other than a recess is performed on said machining area.

4. A method for determining a machining method as claimed in claim 2, wherein when it is determined that no longitudinal recess shape exists and said end surface recess shape exists, processing for a general recess is performed on said machining area.

5. A method for determining a machining method as claimed in claim 2, wherein when it is determined that said longitudinal recess shape exists and no end surface recess shape exists, processing for a general recess is performed on said machining area.

6. A method for determining a machining method as claimed in claim 1, wherein cutting conditions and machining sequence are determined after said machining areas are combined.

7. A method for determining a machining method as claimed in claim 6, wherein said machining area, cutting direction, cutting tool, cutting conditions and machining sequence are stored in a machining process table storing section.

* * * * *